Feb. 26, 1924.  
F. EBERHART ET AL  
CAN DRYING APPARATUS  
Filed Jan. 24, 1920   16 Sheets-Sheet 1

1,484,629

Feb. 26, 1924.

F. EBERHART ET AL

CAN DRYING APPARATUS

Filed Jan. 24, 1920    16 Sheets-Sheet 11

1,484,629

Inventor

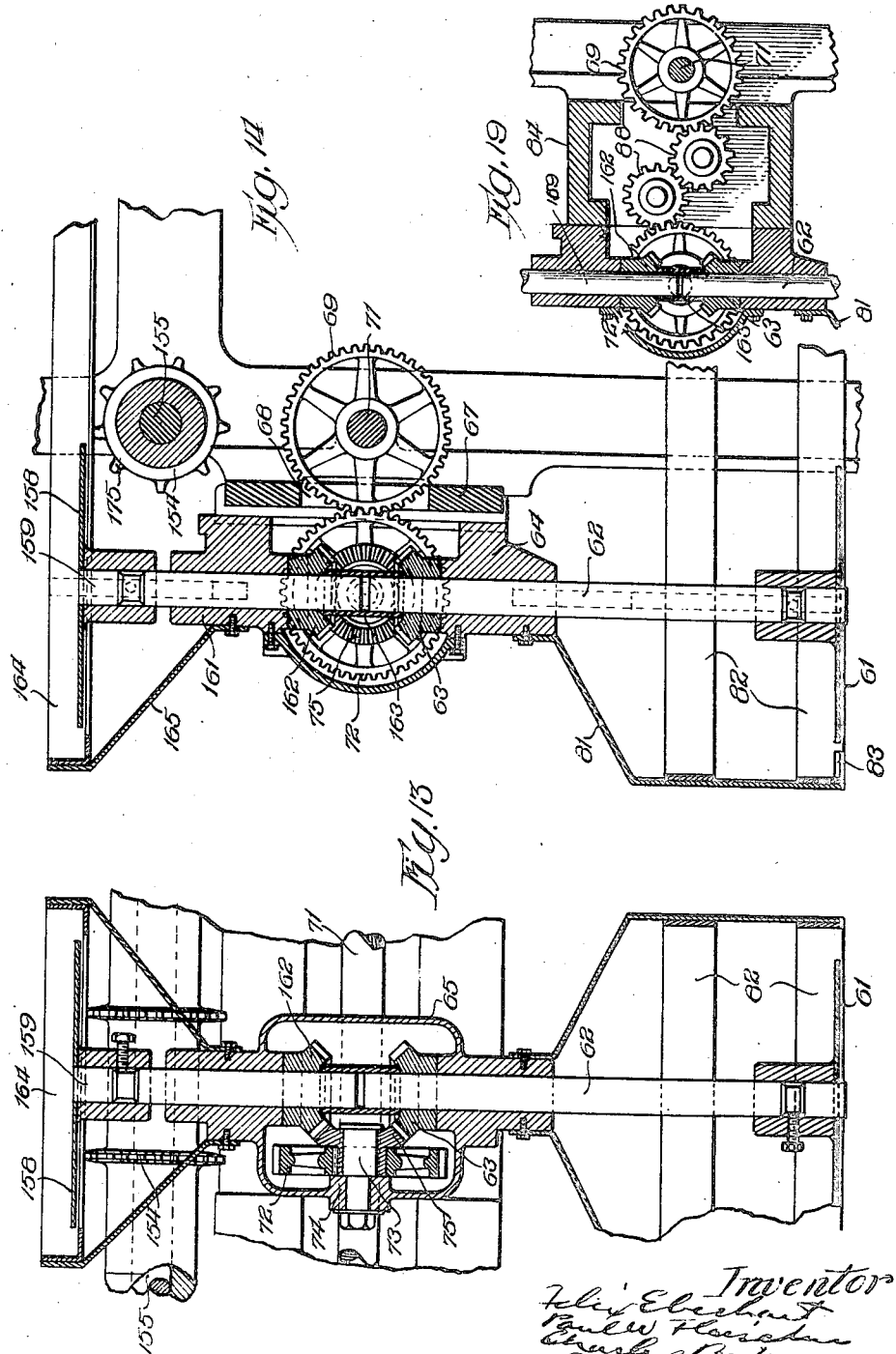

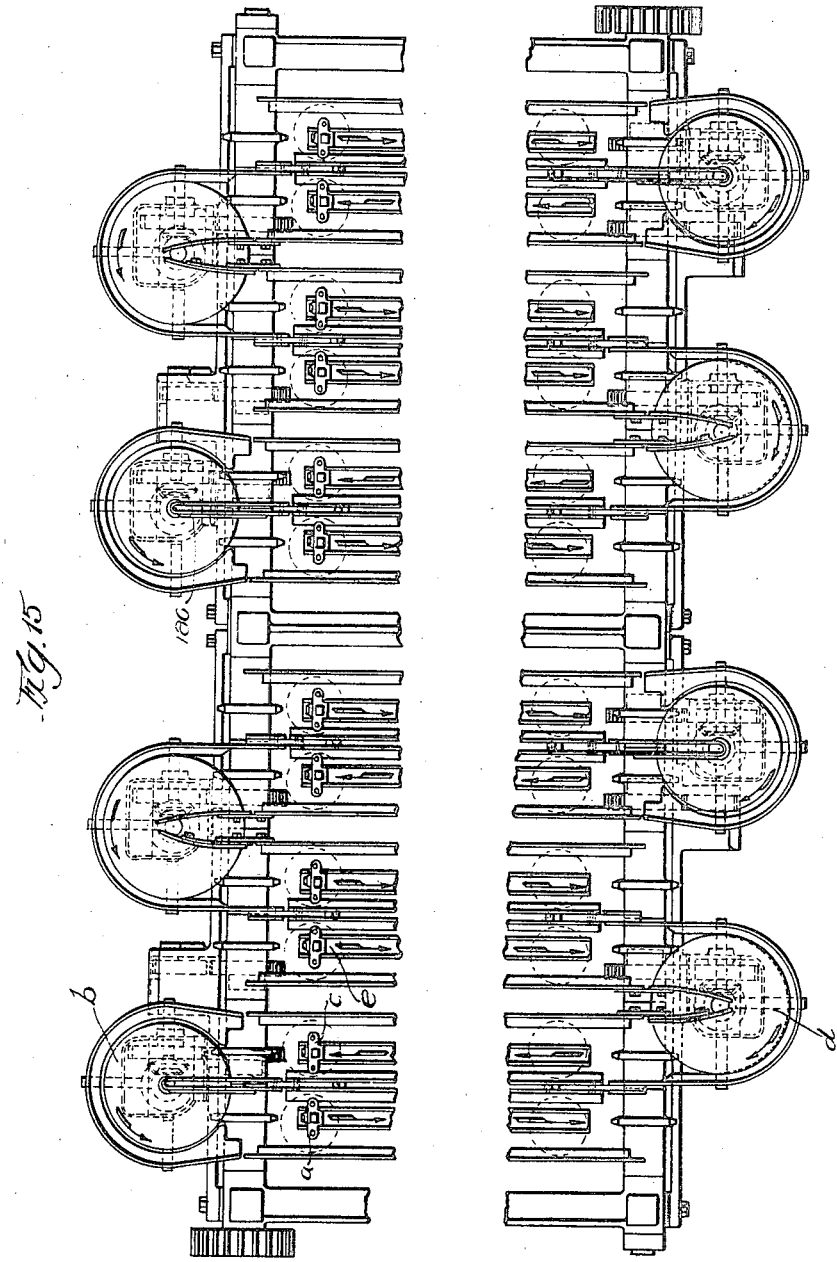

Feb. 26, 1924.
F. EBERHART ET AL
1,484,629
CAN DRYING APPARATUS
Filed Jan. 24, 1920   16 Sheets-Sheet 14
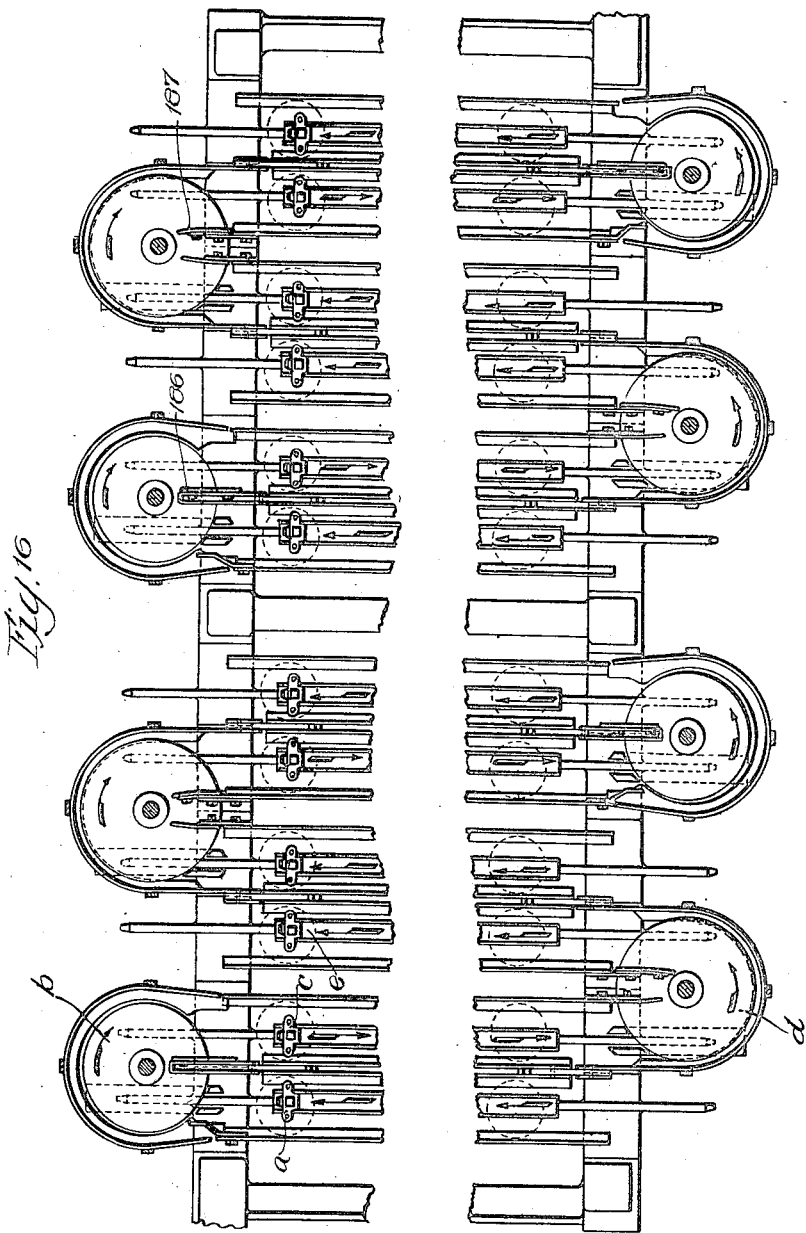

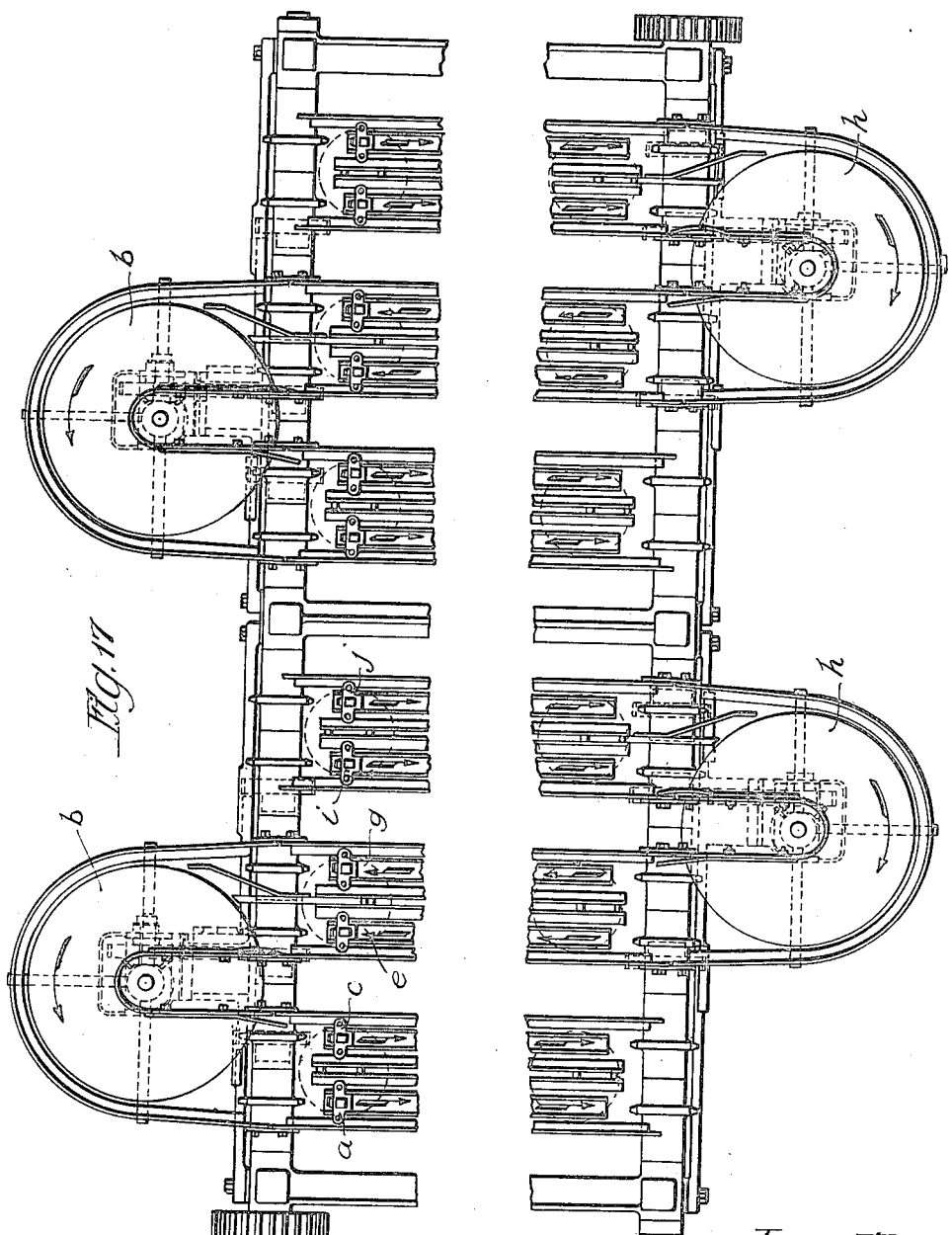

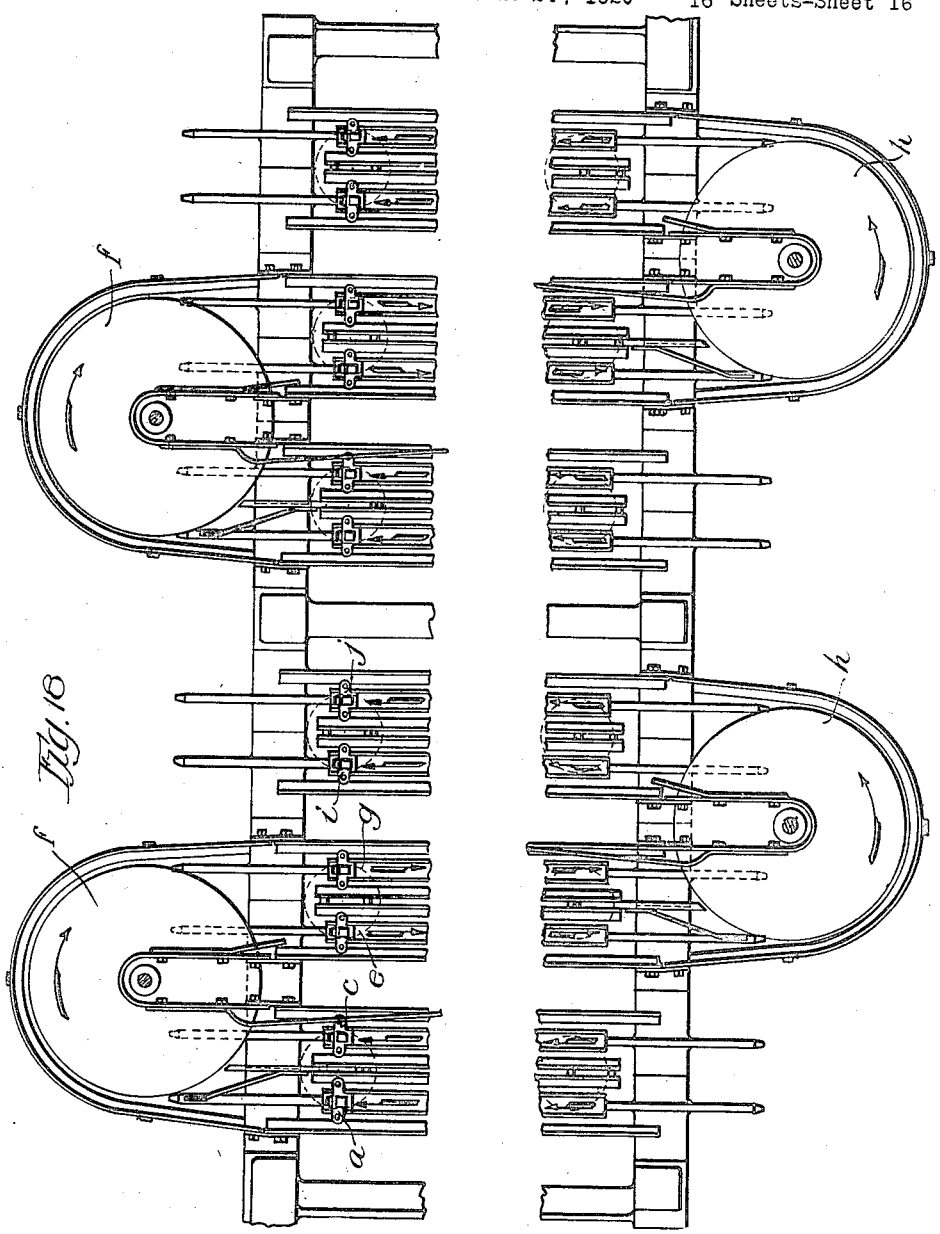

Patented Feb. 26, 1924.

1,484,629

UNITED STATES PATENT OFFICE.

FELIX EBERHART, OF NEWARK, AND PAUL W. FLEISCHER, OF WEEHAWKEN HEIGHTS, NEW JERSEY, AND CHARLES H. BUHMANN, OF NEW YORK, N. Y., ASSIGNORS TO AMERICAN CAN COMPANY, OF NEW YORK, N. Y., A CORPORATION OF NEW JERSEY.

CAN-DRYING APPARATUS.

Application filed January 24, 1920. Serial No. 353,807.

*To all whom it may concern:*

Be it known that we, FELIX EBERHART, residing at Newark, in the county of Essex and State of New Jersey, PAUL W. FLEISCHER, residing at Weehawken Heights, in the county of Hudson and State of New Jersey, and CHARLES H. BUHMANN, residing at New York (% American Can Company), New York County, and State of New York, citizens of the United States, have invented a new and useful Improvement in Can-Drying Apparatus, of which the following is a specification.

This invention relates in general to driers and conveyers usable therewith and has more particular reference to apparatus of this character adapted to handle cans and the like.

A principal object of the invention is the provision of an efficient apparatus for properly drying tin cans which have been lacquered or enameled after the cans are constructed. It will however be manifest that the invention has other valuable uses and certain of the features of it are capable of individual use.

Numerous other objects and advantages of the invention will be apparent as it is better understood from the following description, which taken in connection with the accompanying drawings discloses a preferred embodiment thereof.

Referring to the drawing,

Figure 1 is an end view of an apparatus embodying our present invention, the chamber forming walls being removed;

Figs. 2 and 3 together constitute a top plan view of the same;

Figs. 13 and 14 are detail sections through the rotating disks and their driving mechanisms;

Fig. 15 is a top plan view of the conveyor system, the central portion thereof being broken away;

Fig. 16 is a similar view taken in a plane just above the can body carrying conveyors;

Fig. 17 is a view similar to Fig. 15, the apparatus being arranged to dry cans of large dimensions;

Fig. 18 is a section taken similarly to the section shown in Fig. 16, the arrangement being the same as in Fig. 17; and Fig. 19 is a detail section of the drive for the larger disks.

Figure 1:
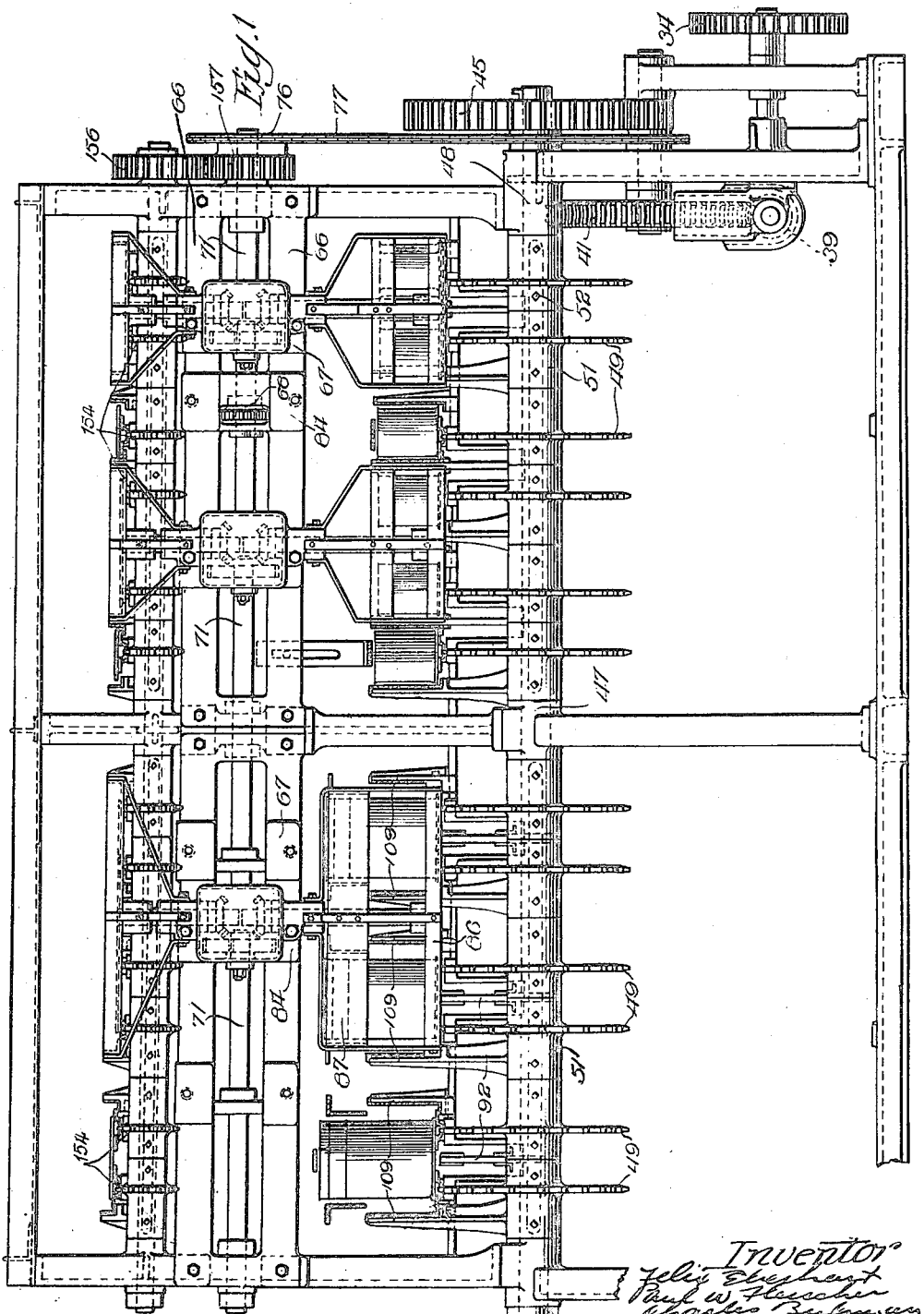

The machine shown on the drawing and for the purpose of illustrating the invention is adapted to dry both the bodies and the ends and to this end conveyer means for drying the bodies are provided through the drying chamber a substantial distance above its bottom and other conveyer means are located in or near the top for drying the ends. The body conveyer means will be first described.

In the present instance, the machine is provided with two groups of six endless conveyers, each for drying the bodies, which conveyers move through a heating or drying chamber maintained at a desired drying temperature. It is intended that these conveyers will carry the cans three times the length of the chamber and means are provided at the ends of the conveyer travel to transfer the cans from one conveyer to another to permit the accomplishment of this result. The conveyers are capable of operating singly to entirely support small cans during conveying or in pairs to permit the two members of each pair to cooperate to together carry larger cans. The transfer means employed with the conveyers operating singly are readily interchangeable for the transfer means for the conveyers operating in pairs, the former serving to transfer cans from one conveyer to the next adjacent and the latter from one pair of conveyers to the next adjacent pair. The apparatus may be arranged to simultaneously dry small and large cans or it may be arranged to dry merely either the small or the large cans.

A substantially closed drying chamber comprising vertical walls 21 and a top wall 22 is provided and in it are arranged suitable burners 23. These walls and burners may have any preferred construction and are merely shown schematically on the drawing. The whole apparatus is mounted in a frame of any suitable construction adapted to support the apparatus and its several operating parts and devices. This frame comprises in the present instance side uprights 24 and center uprights 25, arranged at intervals throughout the length of the heating chamber and these uprights are suitably connected both across and lengthwise of the machine to constitute a rigid structure, examples of the cross-connection being indicated at 26 in Fig. 7 and of the lengthwise-connection at 28 in Fig. 4. They are of course also connected by cross-supports for operative parts, cross shafts, etc., all as will be presently more fully described.

Figure 4:
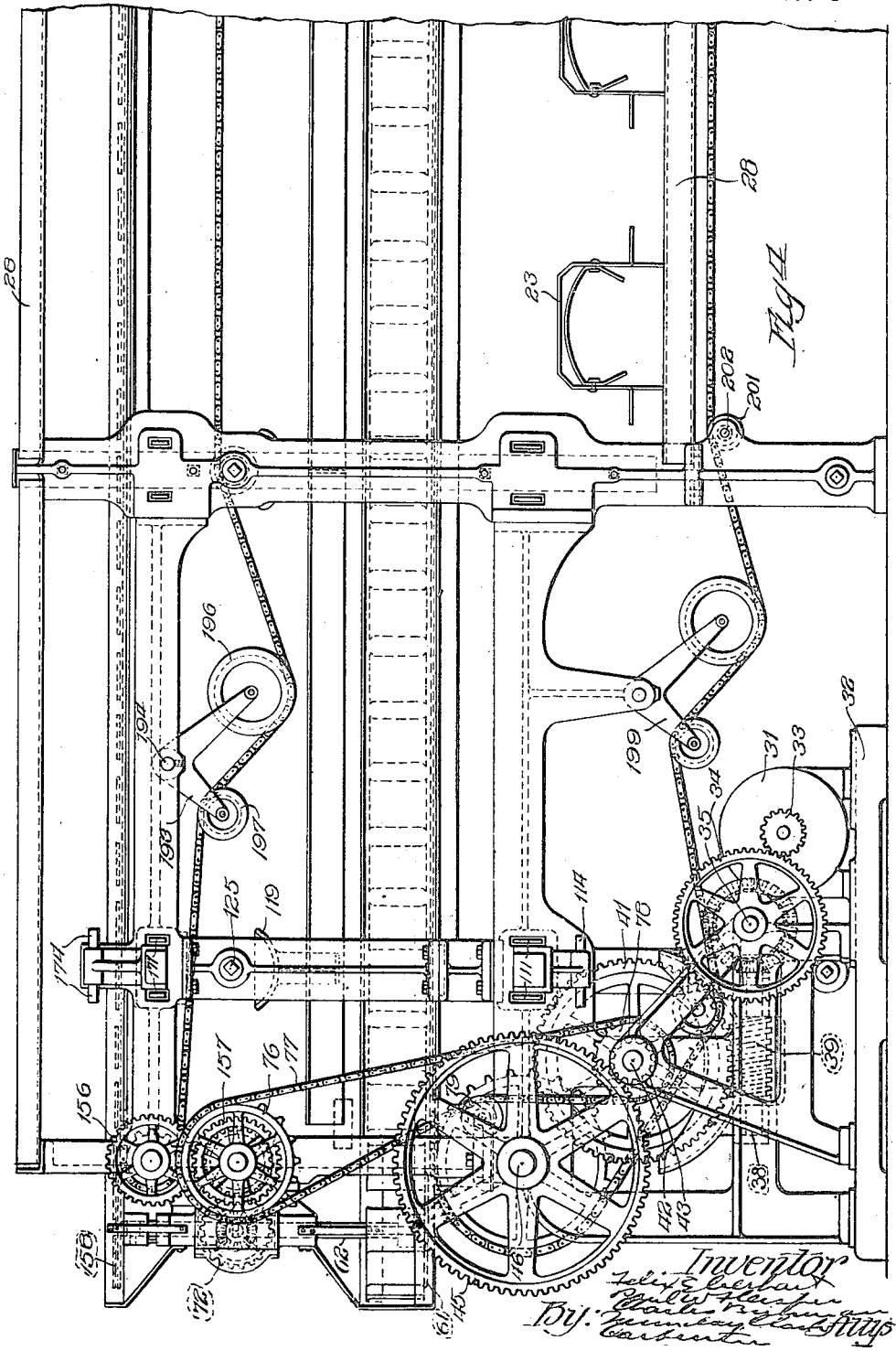
Fig. 4 is a partial side elevation showing a portion of the driving mechanism.
Figure 6:
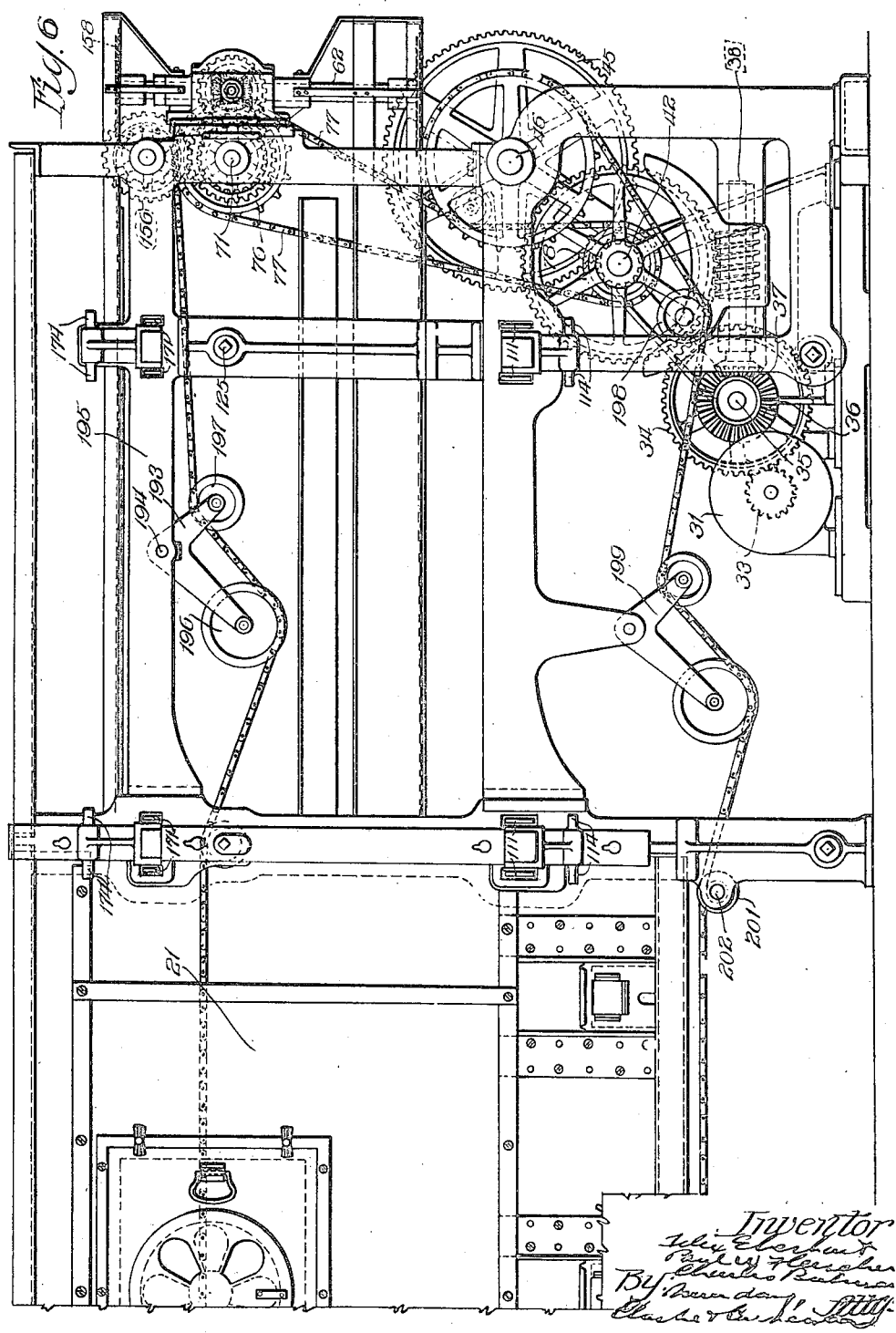
Fig. 6 is a side elevation taken of the other end of the machine and showing a portion of the oven wall in position.
Figure 9:
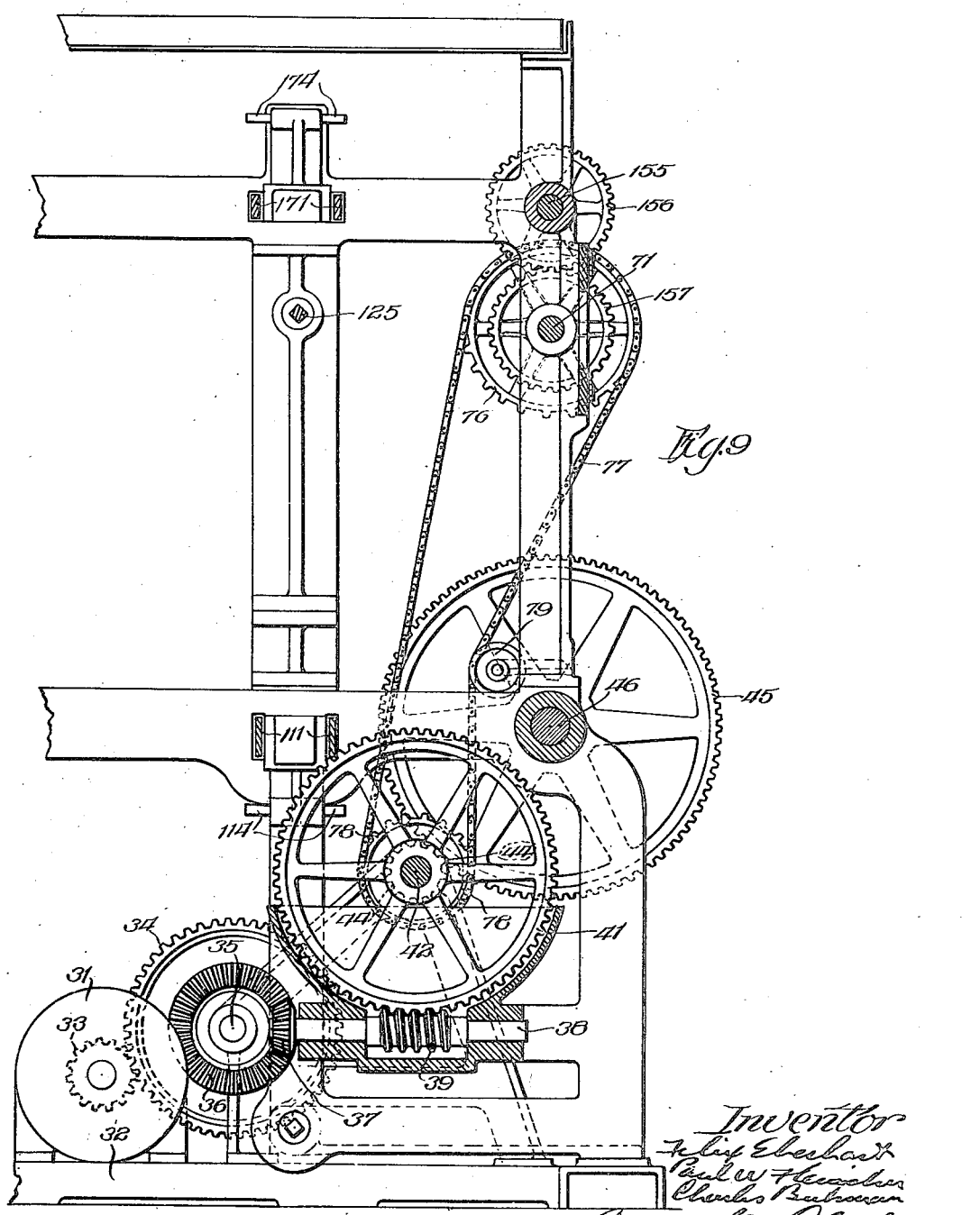
Fig. 9 is a vertical sectional view showing certain details of construction of the driving mechanism.

At each end of the chamber the frame is extended and bearings are provided for suitable power and driving mechanism. A motor 31 is mounted upon a suitable base 32 and is provided with a driving pinion 33 (Fig. 4). This pinion drives a gear 34 on a shaft 35 in the frame and this shaft has fixed upon it a bevel pinion or gear 36 (Fig. 6) meshing with a smaller bevel pinion 37 (Fig. 9) on a shaft 38 also mounted in a bearing casing 38' (Figs. 1, 6 and 9) on the base of said frame and carrying a worm 39 meshing with a worm wheel 41 on a shaft 42. This shaft is mounted in suitably supported bearings 43 and carries a pinion 44 meshing with a gear 45 on a shaft 46 extending clear across the end of the apparatus. The power and driving mechanism just described is rotated continuously and is duplicated at each end of the apparatus. The shafts 46 are the shafts which support and drive the sprockets of the can body carrying conveyers and on each shaft are mounted twelve such sprocket wheels arranged in two groups of six each, said groups being separated by the end central uprights, in which these shafts have bearing at 47, said shafts having bearing also in the end supports at 48. Reference character 49 indicates the sprocket wheels and it will be noted from viewing Fig. 1 that each has a hub having a wide side 51 and a narrower side 52. The arrangement is such in the apparatus shown on the drawing that these hubs of the six sprockets forming a group substantially fill the space between the center bearing 47 and an end bearing 48. The sprocket wheels are placed upon the shaft with the short ends of the hubs abutting in pairs so that the sprockets are arranged in pairs, the members of which are closer together than the distance between the pairs of sprockets.

The sprocket chains consist of links 53 hooked together at 54 and having wings 55 riding upon guide rails 56. These guide rails are supported in the frame in cross bars 57 connecting the side and center uprights.

As has been stated the conveyers of each group or of either group are adapted to singly convey cans. When so acting the group may be considered to be divided in half. This is the arrangement shown in Fig. 16. Referring to this figure, the conveyer moving on the left hand track and indicated by the letter *a* takes cans to the transfer device *b*, the conveyer indicated by the letter *c* takes the cans back through the oven to the transfer device indicated by the letter *d*, which delivers them to the conveyer *e*, which carries the cans a third time through the drying chamber and delivers them from the apparatus. In such arrangement the sprocket wheels for the conveyers *a* and *e* are driven from one shaft 46 and the companion sprockets on the other shaft are loose and the sprocket for the conveyer *c* upon said other shaft is fastened thereon to rotate with the shaft. Figure 18 shows the arrangement with the conveyers operating in pairs and to deliver larger cans and in this arrangement the cans rest upon the two members of the pair while being conveyed as indicated in dotted lines. The two conveyers *a* and *c* together carry the cans through a transfer mechanism *f* like the transfer mechanism *b* except that it is larger and somewhat differently mounted. The conveyer *e* together with the next adjacent conveyer *g* carry the cans to a transfer mechanism *h* which delivers them to the remaining pair comprised of the members *i* and *j*. Each conveyer receives power from the sprocket wheel toward which it is moving in its operative travel, the sprocket wheels for the conveyers *a*, *c*, *i*, and *j* being locked on the shaft at the top of Fig. 18, and the sprocket wheels for the conveyers *e* and *g* on the shaft at the bottom of this figure being locked in place.

Figure 2:
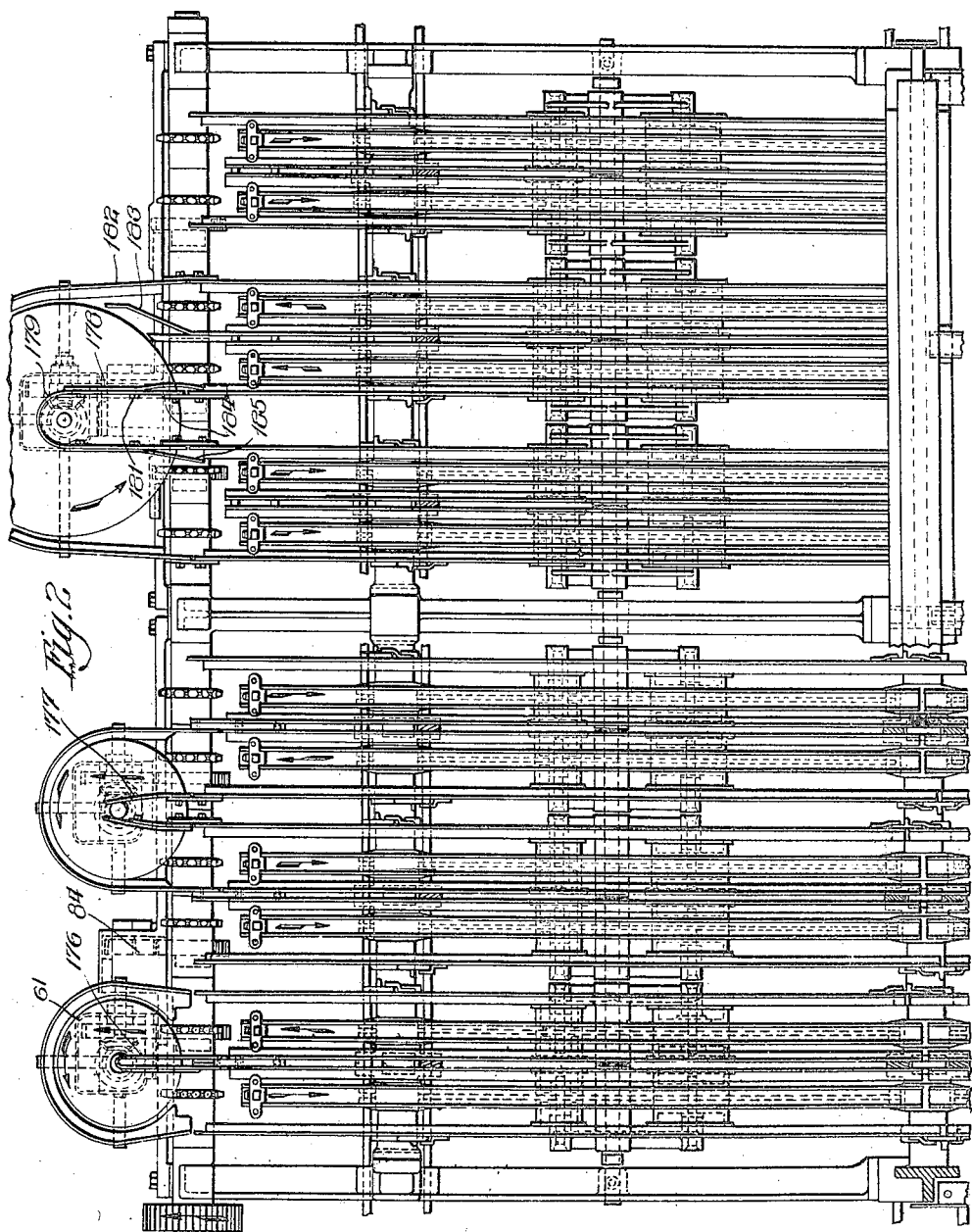
Figure 3:
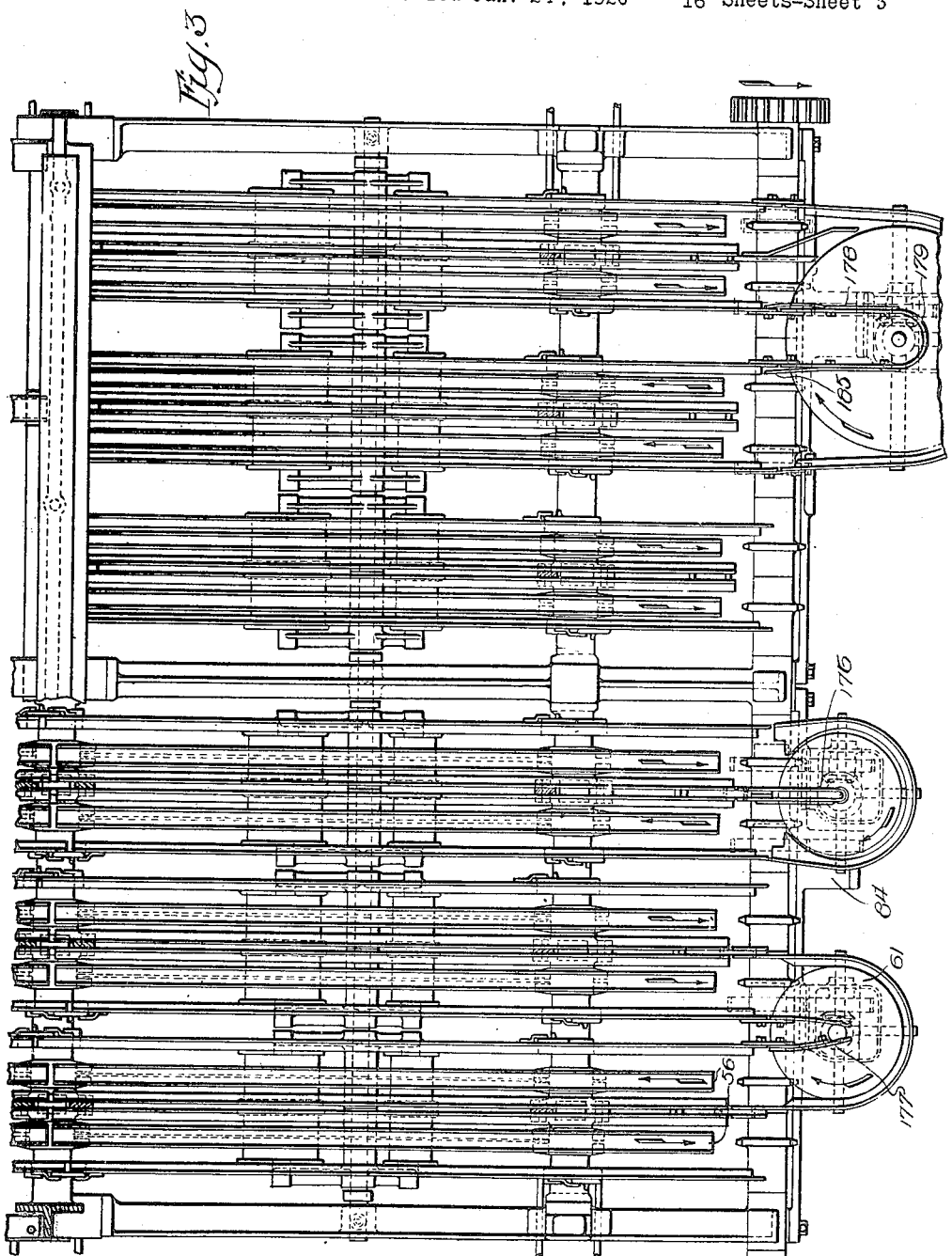

In Fig. 16, both halves of the machine are arranged for smaller cans and in Fig. 18 both halves for larger cans. In Figs. 2 and 3, however, one half is arranged for smaller cans and the other for larger.

The transferring mechanism for transferring the cans in each arrangement will now be described, reference being had more particularly to Figs. 1, 2, 3, 8, 13, 14, and 19. Considering first the transfer mechanism for the conveyers acting singly, it will be noted that each comprises a rotating disk 61 disposed in horizontal position adjacent and between the conveyer from which the can is to be taken and the conveyer to which it is to be delivered. These disks are supported upon the lower end of a rotating shaft 62 in turn supported by a bevel gear 63 upon its upper end. The shaft passes through a bearing 64 in a housing 65 which is adapted for attachment upon the outer face of a skeleton cross member 66 extending between and secured to appropriate uprights at the end of the frame. Each cross member 66 includes integral vertical attaching plates 67, each of which is provided with an opening 68 at one side through which a gear 69 upon a shaft 71 extends and upon which may be fastened a housing of the transfer mechanism. This gear is in mesh with a companion gear 72 within the housing 65 and upon a stub shaft 73 journaled in a bearing 74 in the housing. The gear 72 has fast to it a bevel pinion 75 in mesh with the bevel pinion 63 on the shaft 62. The shaft 71 extends clear across the apparatus and is provided at its outer end with a sprocket wheel 76 over which is trained a sprocket chain 77 which runs over also a sprocket wheel 78 on the shaft 42 already mentioned. A chain tightener 79 is provided to positively maintain the sprocket chain in accurate operation. The bearing part 64 of the housing extends down and from it depend outwardly extending supports 81 for guides 82 which serve to retain the cans on the disk, the bottom one of said guides being provided with an inwardly extending flange 83 to co-operate with the disk to support the can.

Two supporting plates 67 are located at each end and between appropriate conveyers and the whole transfer mechanism can be taken away and positioned bodily and in units by merely unbolting and bolting them in place. The transfer mechanism for the conveyers acting in pairs is constructed and acts upon the same principle as that already described. The cross frame members 66 are provided with housings 84, extending out at appropriate location and in each of them are provided two intermeshing idle pinions 88, one of which is in mesh with gear 69 on shaft 71 (Fig. 19). The housing 85 of the drive for each larger disk bolts onto the outer face of the housing 84. The disk is larger and the parts are otherwise duplicates of the parts of the transfer mechanism for the conveyers acting singly, corresponding minor changes being made in the guides 86 and guide supports 87.

Guiding mechanism is provided along the sides of operative travel of all the conveyers and certain of these guiding means, i. e., those located between the members of the conveyers which operate as pairs, are movable into and out of an operative position to respectively guide or aid in the guiding of the cans on them when acting singly and to permit them to be out of the way when the conveyers are operating in pairs as has been described. Other guiding means are disposed alongside the pairs of conveyers and these guiding means are each adjustable toward and from said conveyers and of course toward and from the movable or retractable guides between them to provide adjustment as between themselves for large cans and between themselves and the movable and retractable guides for the smaller cans.

Figure 5:
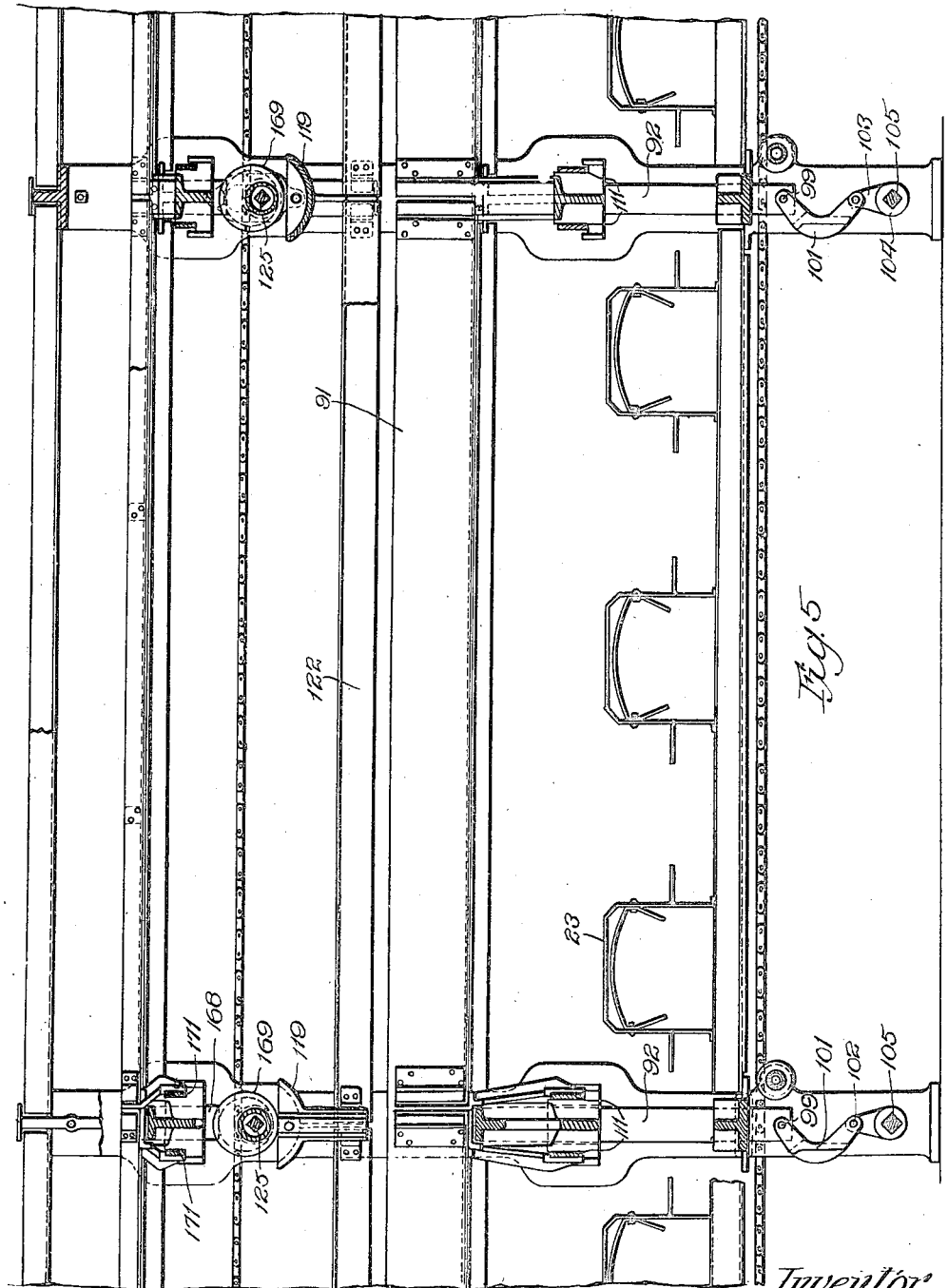
Fig. 5 is a view similar to Fig. 4 and showing an adjacent part of the apparatus in section.
Figure 7:
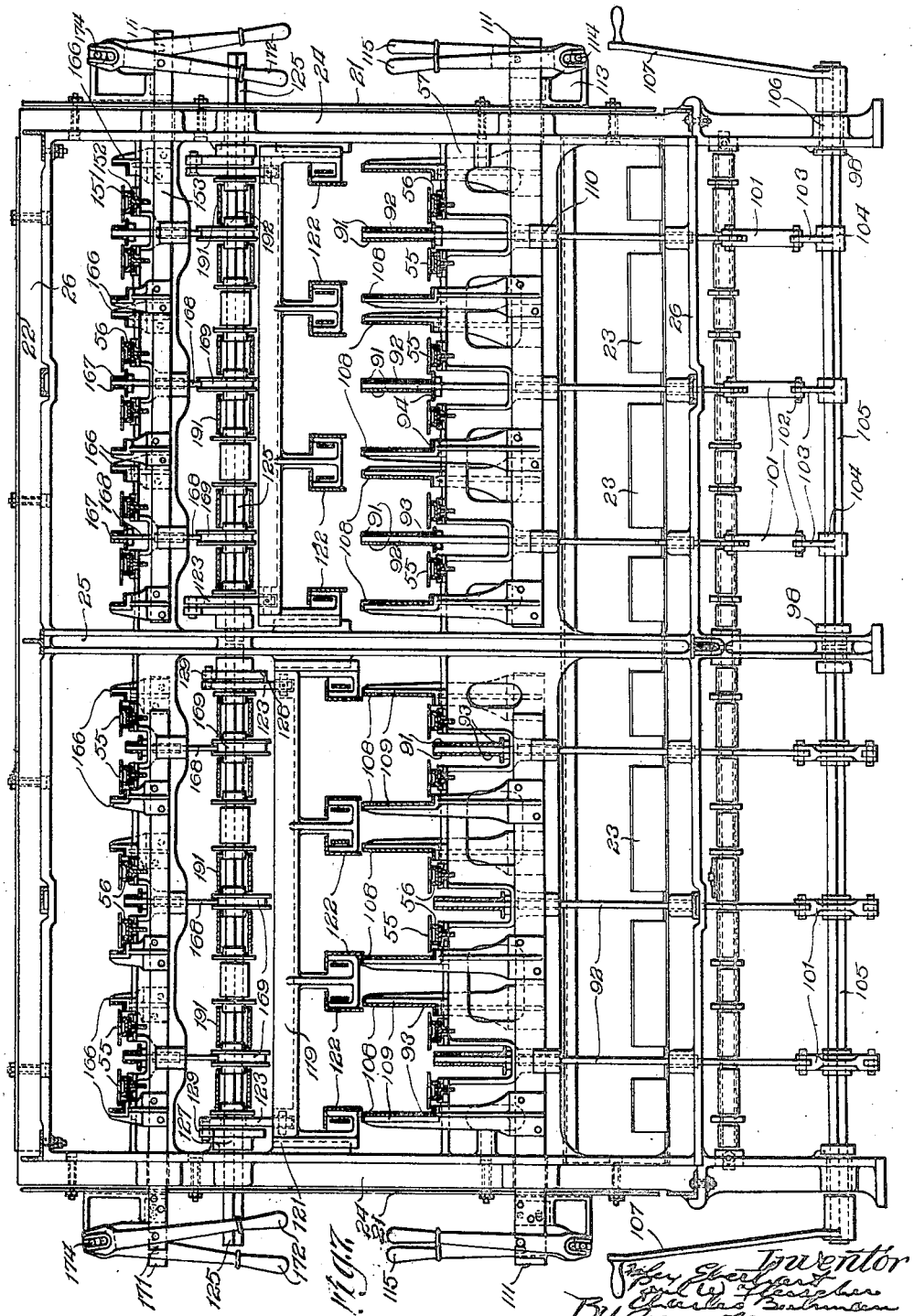
Fig. 7 is a transverse vertical sectional view through the apparatus.
Figure 8:
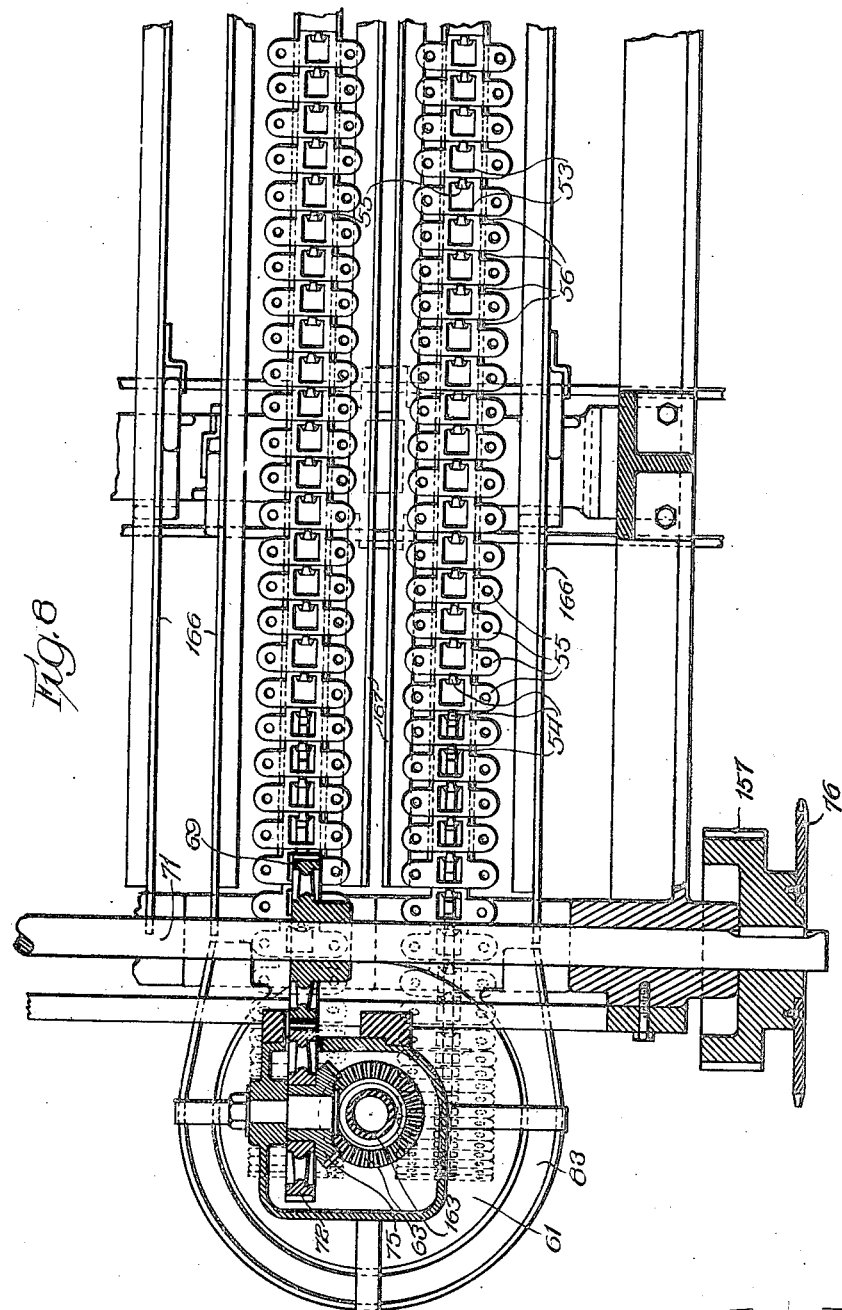
Fig. 8 is an enlarged plan view of an end of a pair of conveyors.
Figure 10:
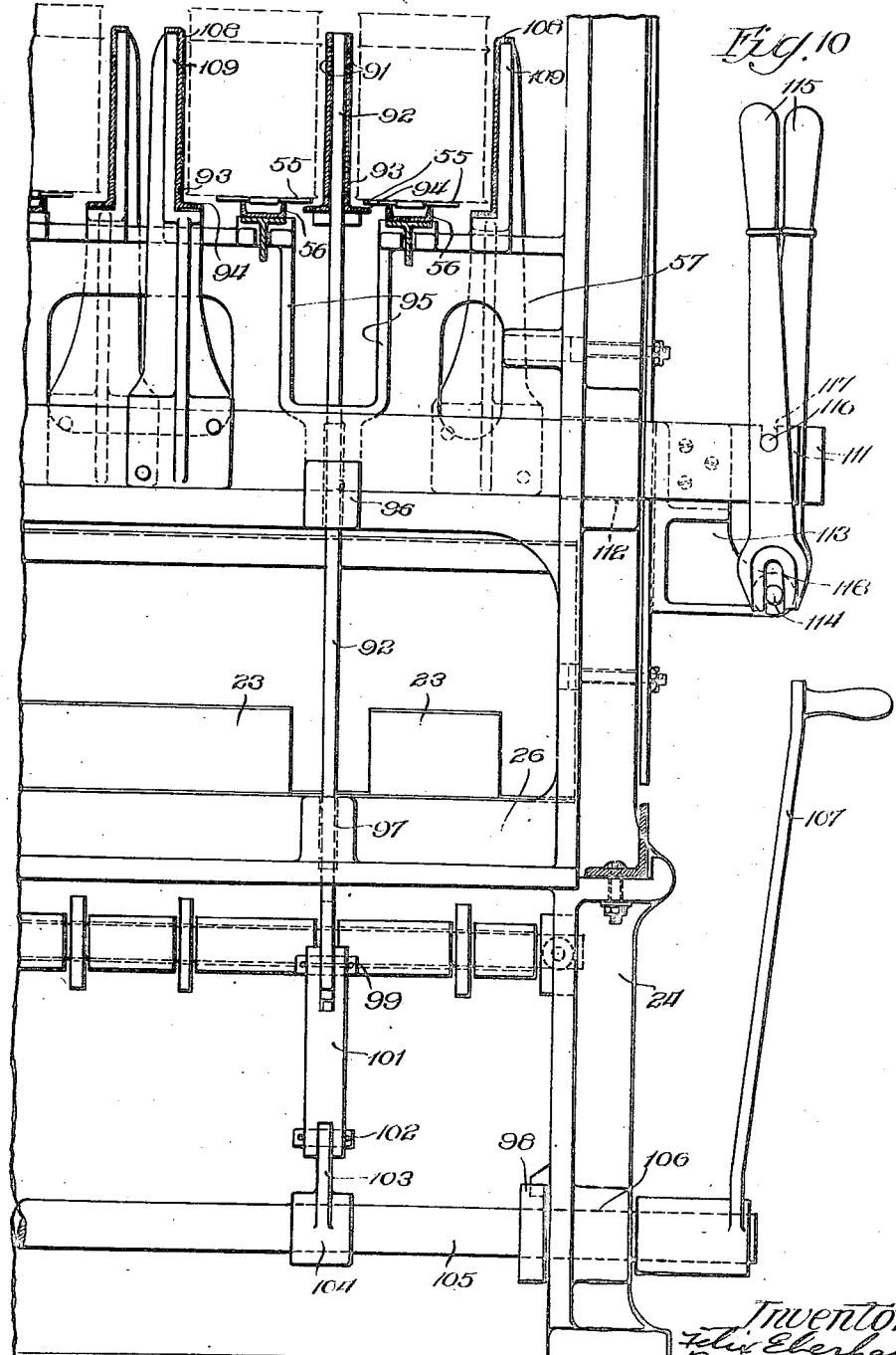
Fig. 10 is a partial enlarged section through the frame showing details of the mechanism for adjusting the guiding means for the can bodies.

The construction and operation of the retractable guides will first be described, reference being had more particularly to Figs. 7, 5, and 10. The central and retractable guides consist in each instance of a pair of longitudinally extending plates or bars 91 fixed upon the upper ends of supports 92 and extending throughout the length of the operative travel of the conveyer. The supports 92 are also connected by longitudinally extending channel members 93 each having a flange 94 disposed adjacent the track 56 of an appropriate conveyor, the flanges 94 being adapted to aid in supporting the cans and conveyor on occasion. The cross supports for the track are provided with pockets or recesses 95 to permit the guides to be retracted downwardly. The guide supports 92 extend through guiding slots 96 disposed through the track supports beneath the pockets and also through guiding slots 97 in lower cross supports 26. At their lower ends the guide supports are pivoted at 99 to curved links 101 in turn pivoted at 102 to arms 103 extending out from collars 104 fixed on a square cross shaft 105 which cross shaft is disposed through bearings 106 in the side and center uprights, the collars 98 being provided to surround the shaft in each bearing to permit the shaft to rotate. Each shaft 105 extends half way across the machine and out of the side where it is provided at its end with a crank 107 adapted to rotate the shaft and through adjacent links 101 to raise and lower the retractable guides. These link connections act as toggles to hold the guides elevated.

The horizontally adjustable guides which are arranged in pairs on the outsides of the conveyers are operable conjointly in pairs and consist of horizontal guiding members 108 mounted upon the upper ends of arms 109 which in turn are carried by two slide bars 111 which extend from adjacent the center through the adjacent side of the machine at intervals. These bars have sliding bearings through apertures 112 in the side frame uprights and have bearing also in bosses 110 on the sides of the cross support 57. The arms 109 are arranged in two sets, those at the left of each pair of conveyers being secured and carried by one slide bar at each upright and those at the right of conveyers being secured and carried by the companion slide bar. A bracket 113 extends out between and beneath the two bars 111 and is provided at its lower outer end with two pins 114. Two levers 115 are provided to manipulate the slide bars 111 and each of these levers is provided with a slot through which the end of the slide bar extends and across which slot is a pin 116 adapted to engage in a slot 117 in the upper face of the slide bar. Each lever has a slot 118 in its lower end in which may be embraced the pin 114 of the bracket 113. To adjust the guides toward and from each other or toward and from the retractable guides when the latter are in operative position, the levers 115 are moved in opposite directions.

As has been stated, the slide bars are arranged in sections, each section extending under each set of six conveyers, and the shafts 105 are also similarly divided at the center so that it is possible to arrange one half the apparatus to operate upon large cans and the other half at the same time to operate upon smaller cans. All of the guides are made in sections arranged end to end and meeting at the uprights and are connected so that there is sufficient play to permit the operation of the adjusting controls.

Figure 11:
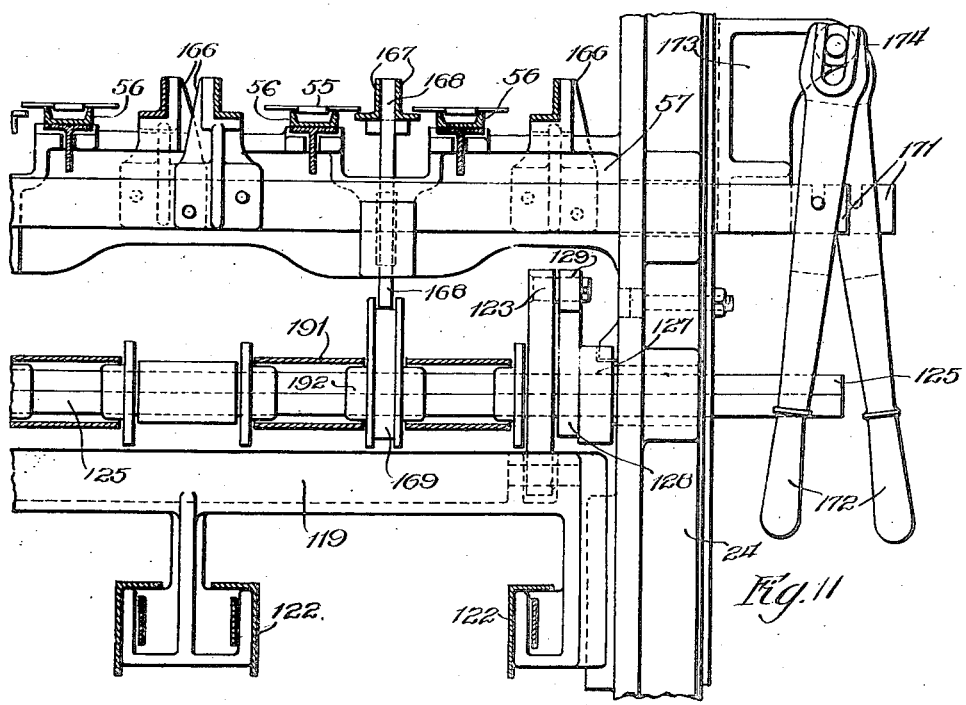
Fig. 11 is a similar section showing the means for adjusting the guiding means for the can ends.
Figure 12:
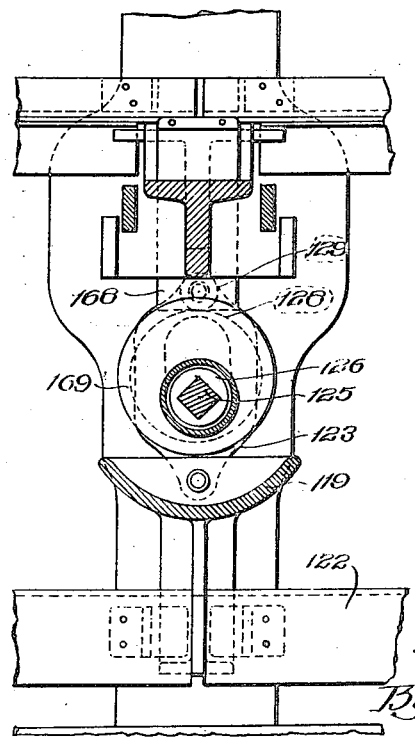
Fig. 12 is a detail section of a portion of the connection between the retractable guides for the can ends and the manipulative means therefor.

If desired guide extensions may be provided to cooperate with the horizontally movable guides when the conveyers are operating in pairs and carrying cans of greater height than can be safely carried by the pairs of conveyers with the horizontally movable guides alone. Referring to Fig. 7 it will be noted that cross bars 119 are slidably mounted in guides 121 located upon the adjacent faces of end and center uprights. These cross bars carry the depending guides 122 adapted to be lowered down adjacent the tops of the guides 108 as seen on the left hand side of the figure and to be raised thereabove as seen on the right hand side. These crossbars are supported by upwardly extending links 123 (Figs. 11 and 12) said links being slotted as indicated at 124 to permit a square shaft 125 embraced by cylindric sleeves 126 having bearings 127 in the uprights (side and center) to pass through the links. Adjacent the links 123 eccentrics 128 are provided and on the tops of these eccentrics engage rollers 129. Turning of the shaft through a rotation of the eccentrics causes these auxiliary guides to move vertically as occasion may require.

The cans are preferably engaged by the several guiding means described by contact of said guiding means with the top and bottom seams. The purpose of this is to prevent marring or scratching of the coating on the side walls of the cans by the guides. To this end the laterally and vertically movable guides extend a sufficient height to engage the two seams of the cans when the conveyers act singly and the guides 122 act to engage the top seams of longer cans when said longer cans are carried on the conveyers acting in pairs. The guides on the transfer mechanisms are preferably similarly arranged to engage the seams or end flanges of the cans.

Through the provision of relatively little space above the conveying mechanism just described arrangement may be made for drying the can ends in the same ovens. Except for slight incidental changes this mechanism is a duplication of the mechanism for drying the can bodies. Moreover little more than additional conveyers, guides and transfer mechanism need be added.

The conveyers generally indicated at 151 are mounted upon tracks 152 carried by track supports 153 all similar to the conveyers, tracks and track supports for the can bodies already described. The conveyers are trained over sprockets 154 on shafts 155 in the upper part of the frame and the shafts 155 are provided with gears 156 meshing the gears 157 on shafts 71 which in turn are driven as has been stated by sprocket chains 77, gear 41, worm 39, etc. from the motor. The mounting of these sprocket wheels is similar to that of the sprocket wheel 49 and they are similarly operable. The transfer mechanisms (Figs. 13 and 14) comprise disks 158 carried on the upper ends of posts 159 mounted in bearings 161 in the housings 65 and having near their lower ends beveled gears 162 in constant mesh with beveled gears 75 driven by the shaft 71 by gears 69 and 72. A sleeve 163 embraces the lower end of each shaft 159 and upper end of shaft 62 which sleeve cooperates with the bearings 64 and 161 to maintain the parts in proper registration. Guides 164 supported by braces 165 from the housing are disposed about the disks and extend back into cooperation with the side guides (horizontally movable guides) 166.

The central retractable guides 167 are provided between the conveyers of each pair of conveyers and as with the can body conveyers, these guides are supported upon guide supports 168 slidable in the track supports 153. The lower ends of the guide supports rest on the top of eccentrics 169 mounted on the square shafts 125 already mentioned. When the guides are to be raised to an operative position between the conveyers to accommodate cans of small diameter, it is intended that the conveyers for the can bodies therebelow shall be arranged to convey cans of like diameter, that is to say that the arrangement is preferably such that the bodies and ends for the same will be dried at the same time in the same part of the apparatus.

The normal diameter of a small can usually bears such relation to its height that the range of adjustment of the various guides permits the guides 122 to be out of position to interfere with a can carried on a single conveyer when the guides 122 are elevated, and when larger cans are carried on the pairs of conveyers the guides may be moved in adjacent the conveyers and still have sufficient distance between them and between the guides 122 to permit cans up to a considerable size to be dried.

The horizontally movable or adjustable guides 166 are carried on two bars 171 like the bars 111 and these bars are operated by levers 172 like the levers 115 and similarly arranged, brackets 173 being provided above the bars and having pins 174 for engagement by the levers.

In order that the can bodies and can ends may be accurately and positively delivered to the transfer mechanisms, the teeth 175 of the sprockets 154 and 49 are made longer than the usual sprocket tooth and engage under the bottom of the bodies and ends lifting their forward parts so that they slide easily onto the rotating disks. Auxiliary central guides 176 and 177 are provided to extend over the disks for the covers when the conveyers are operating singly. Where the can ends are transferred from one to the other of a pair of conveyers the guide 176 is attached as a mere extension of the central guide between said conveyers and where the transfer is from a single member of a pair of conveyers to the adjacent single member of the next pair the guide 177 is attached to the two horizontally movable guides between the two and either of them may consist of one or two members as desired. Where the cover conveyers are operating to convey large can ends, i. e., operating in pairs an auxiliary guide 178 preferably extends over the center of the disk of larger diameter and as shown in Fig. 2, consists of a metal strap bent at 179 and having its two ends secured at 181 to the adjacent ends of the two middle horizontally adjustable conveyor guides and the outside guide 182 of the larger disk may be similarly connected to the two outside horizontally movable conveyer guides. Where the large disk is used an auxiliary end support 183 may be provided to extend out from the retracted central guide of the delivering conveyers into the space between the end of the adjacent portion of the guide 182 and the disk and if desired, a deflector 184 may be provided upon the adjacent face of the guide 179 to space the cans in the direction of movement of the disk. And a centering leaf 185 may be provided also to feed the cans accurately onto the two conveyers. Similar guiding means is preferably also provided for the small and large turrets or disks of the can body transfer mechanism as may be easily observed on viewing Figs. 16 and 18 the only difference in the two residing in the fact that where the smaller disks are used the guides 186 and 187 although like the guides 176 and 177 terminate short of the posts or shafts 62.

As has been stated the conveyers are of endless chain form and of course have idle return travel beneath their operative travels. The conveyers 156 return over roller sleeves 191 rotatedly mounted on cylindrical collars 192 on the square shafts 125 and tensioners are provided for these conveyers at each end. Bell cranks 193 are pivoted at 194 in horizontal frame members 195 and carry large relatively heavy rollers 196 and smaller relatively lighter rollers 197 in the ends of the arms of the bell cranks. The arms carrying the rollers 196 are longer than the arms carrying the rollers 197. The conveyers pass over the rollers 197 and under the rollers 196 so that the relative weight of the rollers aided by the relation of the lengths of the arms of the bell cranks causes the rollers 196 to press down on the conveyors and the rollers 197 to press up on them to cause them to remain in tight accurately operating condition.

The conveyors for the can bodies pass under idle rollers 198 located in the ends of the frame, past tighteners 199 like the tighteners for the conveyors for the can ends and then over rollers 201 on successively arranged shafts 202 beneath the oven.

It is thought that the invention has many attendant advantages which will be understood from the foregoing without further description and it is believed that various changes may be made in the form, construction, and arrangement of the parts and without departing from the spirit and scope of the invention or sacrificing all of its material advantages, the form hereinbefore described being merely a preferred embodiment thereof.

We claim:

1. An apparatus for operating upon cans comprising, in combination, an enclosed heating chamber, a plurality of pairs of separate conveyors moving lengthwise of said chamber side by side and around horizontal axes, a shaft for driving said conveyors extending transversely through the units of said pairs, means rotating on vertical axes for transferring cans from one conveyor to the other of its pair whereby to permit the cans to pass through the chamber a plurality of times on said conveyors, and burners arranged beneath said conveyors.

2. An apparatus for operating upon cans comprising in combination, a plurality of pairs of conveyors arranged side by side, and having operative travels in both directions through said chamber about horizontal axes, and means for transferring cans laterally from one operative travel to the other at substantially the same level, whereby to permit them to pass through said chamber a plurality of times in each direction.

3. A conveying apparatus for operating upon cans in an enclosed drying chamber comprising in combination, a plurality of conveyers movable therethrough and adapted to conjointly carry large cans and to singly carry small cans through said chamber.

4. A conveying apparatus for operating upon cans in an enclosed drying chamber comprising in combination, a plurality of conveyers movable therethrough and adapted to conjointly carry large cans and to singly carry small cans through said chamber, and guiding means arrangeable to hold cans on said conveyers in their conjoint operation and in their single operation.

5. A conveying apparatus for operating upon cans in an enclosed drying chamber comprising in combination, a plurality of conveyers movable therethrough and adapted to conjointly carry large cans and to singly carry small cans through said chamber, and guiding means arrangeable from without said chamber to hold cans on said conveyers in their conjoint operation and in their single operation.

6. A conveying apparatus for operating upon cans in an enclosed drying chamber comprising in combination, a plurality of conveyers movable therethrough and adapted to conjointly carry large cans and to singly carry small cans through said chamber, guiding means outside said conveyers adapted to aid in the guiding of cans carried thereby, and guiding means between said conveyers removable to an inoperative position to permit cans to ride on adjacent conveyers.

7. A conveying apparatus for operating upon cans in an enclosed drying chamber comprising in combination, a plurality of conveyers movable therethrough and adapted to conjointly carry large cans and to singly carry small cans through said chamber, and guiding means for accurately retaining cans on said conveyer and adjustable throughout a range for different size small cans to different size large cans on said conveyer.

8. A conveying apparatus for operating upon cans in an enclosed drying chamber comprising in combination, a plurality of conveyers movable therethrough, guiding means between said conveyers and movable to an inoperative position, and means disposed without the chamber for moving said guiding means into and out of operative position.

9. A conveying apparatus for operating upon cans in an enclosed drying chamber comprising in combination, a plurality of of conveyers movable therethrough, can guiding means movable laterally toward and from said conveyer and can guiding means movable vertically into and out of an operative guiding position between said conveyers.

10. A conveying apparatus for operating upon cans in an enclosed drying chamber comprising in combination, a plurality of of conveyers movable therethrough, can guiding means movable laterally toward and from said conveyer and can guiding means movable vertically into and out of an operative guiding position between said conveyers both said means having manipulating devices located without the chamber.

11. A conveying apparatus for operating upon cans in an enclosed drying chamber comprising in combination, conveyer mounted therein and operable in opposite directions to progressively carry a can through the chamber and operable in the same direction to conjointly carry a can through the chamber.

12. A conveying apparatus for operating upon cans in an enclosed drying chamber comprising in combination, conveyer mounted therein and operable in opposite directions to progressively carry a can through the chamber and operable in the same direction to conjointly carry a can through the chamber, and guiding means adjustable in accordance with the character of action of said conveyer.

13. A conveying apparatus for operating upon cans in an enclosed drying chamber comprising in combination, an even number of conveyers movable therethrough, said conveyers being operable singly to convey cans through the chamber and in pairs to convey cans through the chamber.

14. A conveying apparatus for operating upon cans in an enclosed drying chamber comprising in combination, an even number of conveyers movable therethrough, said conveyers being operable singly and successively to convey cans through the chamber a plurality of times and in pairs, said pairs operating progressively to convey cans through said chamber a plurality of times.

15. A conveying apparatus for operating upon cans in an enclosed drying chamber, comprising in combination an even number of conveyers movable therethrough, said conveyers being operable singly and successively to convey cans through the chamber a plurality of times and in pairs, said pairs operating progressively to convey cans through said chamber a plurality of times, and means for transferring cans from said conveyers when said conveyers are acting singly and in pairs.

16. A conveying apparatus for operating upon cans in an enclosed drying chamber, comprising in combination, an even number of conveyers movable therethrough, said conveyers being operable singly and successively to convey cans through the chamber a plurality of times and in pairs, said pairs operating progressively to convey cans through said chamber a plurality of times, and means for transferring cans from said conveyers when said conveyers are acting singly and in pairs, said means comprising transfer mechanisms individualized to the particular character of operation of the conveyers and readily interchangeable one for the other.

17. A conveying apparatus for operating upon cans in an enclosed drying chamber, comprising in combination, a conveyer unit of six conveyers therein, said conveyers being operable in two groups of three each to convey cans three times through said chamber, and as a single group and in pairs to convey cans a like number of times through said chamber.

18. A conveying apparatus for operating upon cans in an enclosed drying chamber, comprising in combination, a plurality of conveyers therein, driving shafts at each end of said chamber and moving in opposite direction, and sprocket wheels on both said driving shafts for each conveyer and adapted for attachment thereto to cause said conveyers to move cans progressively through said chamber a plurality of times when said conveyers carry said cans singly and in pairs.

19. A conveying apparatus for operating upon cans in an enclosed drying chamber, comprising in combination, endless conveyers mounted therein for conveying respectively cans and can covers through said chamber in separated relation.

20. A conveying apparatus for operating upon cans in an enclosed drying chamber, comprising in combination, can body conveying means and can end conveying means comprising endless chains located at different heights in said chamber.

21. A conveying apparatus for operating upon cans in an enclosed drying chamber, comprising in combination, can body conveying means, and can end conveying means comprising endless chains located at different heights in said chamber and operating around horizontal axes, said means each conveying its article through the chamber a plurality of times.

22. A conveying apparatus for operating upon cans in an enclosed drying chamber, comprising in combination, can body conveying means movable therethrough comprising separate endless chains moving about horizontal axes, and can body guiding means arranged along side the travel of said conveying means and engaging the top and bottom edges of the cans in guiding them through said chamber.

23. A conveying apparatus for operating upon cans in an enclosed drying chamber, comprising in combination, a plurality of conveyers movable therethrough and adapted to act singly to carry cans or in pairs, guiding means for guiding cans both when the conveyers are operating singly and in pairs, said guiding means engaging the top and bottom edges of the can bodies in their guiding action.

24. A conveying apparatus for operating upon cans in an enclosed drying chamber, comprising in combination, can body conveying means movable therethrough, guiding means for engaging the top and bottom edges of cans conveyed by said conveying means and auxiliary guiding means for engaging the top edges of can bodies when cans of considerable height are conveyed by said conveying means.

25. A conveying apparatus for operating upon cans in an enclosed drying chamber, comprising in combination, can body conveying means movable therethrough, guiding means for engaging the top and bottom edges of cans conveyed by said conveying means and auxiliary guiding means for engaging the top edges of can bodies when cans of considerable height are conveyed by said conveying means, said auxiliary guiding means adjustable vertically.

FELIX EBERHART.
PAUL W. FLEISCHER.
CHARLES H. BUHMANN